United States Patent Office 2,916,461
Patented Dec. 8, 1959

2,916,461

NOVEL ORGANOSILICON COMPOSITIONS

Karl W. Krantz, Schenectady, N.Y., assignor to General Electric Company, a corporation of New York No Drawing. Application April 30, 1956
Serial No. 581,392

6 Claims. (Cl. 260—2)

This invention is concerned with novel organosilicon compositions especially useful for imparting water-repellency to various materials including porous and solid bodies. More particularly, the invention is concerned with a benzene-insoluble, but water-soluble organosilicon composition obtained by (1) interacting ethylene glycol with a mixture of alkyl alkoxysilanes, the alkyl group being selected from the class consisting of methyl and ethyl radicals, there being present in the mixture of alkyl alkoxysilanes from 50 to 100 mol percent, preferably from 50 to 98 mol percent, of a monoalkyl trialkoxysilane, from 0 to 50 mol percent of a trialkyl alkoxysilane, and from 0 to 10 mol percent of a dialkyl dialkoxysilane, and from 0 to 10 mol percent of a tetra-alkoxysilane, the alkyl group of the alkoxy radical being the residue of a monohydric alcohol containing from 1 to 5 carbon atoms, and there being present before reaction more than one hydroxy group of the ethylene glycol for each alkoxy group in the mixture of alkyl alkoxysilanes, and (2) thereafter heating the mixture of ingredients at a temperature below 100° C. while at the same time removing liberated aliphatic monohydric alcohol. The total percentage of the above ingredients equals 100 mol percent. The invention also includes methods for obtaining these water-soluble organosilicon compositions, as well as uses of the latter as water-repellents and sizing and stiffening agents.

Organopolysiloxanes have been employed for water-repellent purposes in treating various surfaces, such as masonries as is more particularly described in U.S. Patent 2,574,168—Brick. Organopolysiloxanes have also been used in the treatment of various porous textiles such as organic and inorganic cloths. One of the more important applications for organopolysiloxanes is in the treatment of glass fibrous material such as glass cloth, etc., to render the same water-repellent and to improve certain of its properties when the cloth is later fabricated in subsequent applications, particularly in electrical applications. For the most part the organopolysiloxanes employed for treating various materials to render the same water-repellent have been in the form of water-insoluble, organic-solvent-soluble compositions. However, the use of such types of organopolysiloxanes requiring organic solvents introduces the expense and trouble of recovering the solvents. Moreover, the use of organic solvents for organopolysiloxanes has also introduced fire and toxicity hazards especially when using certain of the solvents for organopolysiloxanes of the aromatic type such as benzene, xylene, toluene, etc. Finally, organic solvent solutions of the organopolysiloxanes often do not have the desired penetrating and impregnating characteristics required in order to obtain optimum properties of the treated materials.

Of recent vintage are water-soluble organopolysiloxanes which have been used to a large extent for treating various materials to render the same water-repellent. However, the compositions employed heretofore have also been subject to various disadvantages. In the first place, some of the water-soluble materials are of the monomeric type such as the alkali-metal salts of alkyl silanetriols as are more particularly disclosed in Elliott et al. Patent 2,507,200; these particular materials in addition to requiring extensive condensation to obtain a suitable product are also characterized by the fact that they are strongly alkaline and require extreme caution in handling. Moreover, the produce of condensation includes salts which have to be removed from the surface rendered water-repellent in order to avoid any undesirable changes in the appearance of the material treated, and to obtain the maximum degree of water-repellency.

There have also been disclosed in the past, organopolysiloxane compositions which are water-soluble and which are employed in the form of water solutions. However, these compositions are relatively unstable unless properly dissolved in water. In addition, the techniques whereby these compositions are prepared are relatively expensive and require solution in water before they can be considered in any stable form. Because of this, it is necessary to go to great expense, especially when shipping the materials, in order to keep them in a substantially stable form by means of the aqueous solutions. Moreover the use of the previously known water-soluble organopolysiloxanes in the form of water solutions has left much to be desired as far as water-repellent characteristics are concerned.

I have now discovered a particular class of water-soluble organosilicon compositions which have good storage stability in an undiluted state, and which can be prepared relatively inexpensively employing materials readily available on the market. In addition, such compositions when dissolved in water and used for treating various materials to render the same water-repellent, induce a high degree of water-repellency which is of a surprisingly permanent nature, as contrasted to the less satisfactory durabilities attained with previously known organopolysiloxane compositions. More particularly, I have discovered that benzene-insoluble, but water-soluble, organosilicon compositions having the desirable properties referred to above can be obtained by interacting ethylene glycol with a mixture of alkyl alkoxysilanes of the type described above and in the proportions recited above, and thereafter heating the mixture of ingredients at a temperature below 100° C. while at the same time removing the aliphatic monohydric alcohol which is liberated as the result of the reaction of the alkoxy groups with the ethylene glycol.

The methods for making the compositions herein described require a critical balance of ingredients and proportions in order to obtain the desired products. Within this critical balance of ingredients and proportions, there are certain factors which affect the water-solubility as well as the degree of water-repellency attained using these compositions.

The basic requirements for obtaining a water-soluble product of optimum ability to confer water-repellency are that the organosilicon composition (which contains both silicon-bonded alkoxy radicals and silicon-bonded organic radicals) must be of such constitution that the silicon bonded organic radicals are either methyl or ethyl radicals. Although small amounts of silicon-bonded aromatic radicals, for instance, silicon-bonded phenyl radicals can be tolerated, for optimum water-repellency, it is required that the mixture of alkoxy silanes reacted with the ethylene glycol be substantially free of any silicon-bonded aromatic radicals and preferably such silanes contain only the aforesaid methyl or ethyl radicals (or mixtures of methyl and ethyl radicals) attached directly to silicon by carbon-silicon linkages.

For the concurrent existence of optimum water-solubility and water-repellency (in contradistinction to sizing and stiffening applications), it is preferred that a mixture of alkoxy silanes be used for reaction with the ethylene glycol, the said mixture containing at least 50 mol percent of the monoalkyltrialkoxysilane, from 10 to 20 percent trialkylalkoxysilane, and not more than 10 percent of a dialkyldialkoxysilane. Small amounts not exceeding 1 to 5 mol percent phenyltrialkoxysilane can be used but are not preferred. Also, for optimum water-repellency, the mixture of alkoxysilanes should be substantially free of any tetraalkoxysilane (which is intended to include polyalkoxysilanes), for instance, ethyl orthosilicate.

The alkoxy silane is advantageously obtained by effecting reaction between the individual lower alkyl hydrolyzable silanes (capable of reacting with a monohydric alcohol to make the alkoxysilanes) and a monohydric alcohol or a mixture of lower alkyl hydrolyzable silanes and a monohydric alcohol. The hydrolyzable silanes used to make the alkoxysilanes, may be chlorosilanes, for instance, alkylchlorosilanes. A particular range of ingredients of this type which may advantageously be employed is found described in the following table:

TABLE I

| Ingredient | Molar Concentration |
| --- | --- |
| $RSiCl_3$ | 50 to 100 (preferably 50 to 98) mol percent. |
| $R_2SiCl$ | 0 to 50 mol percent. |
| $R_2SiCl_2$ | 0 to 10 mol percent. |
| $SiDl_4$ | 0 to 10 mol percent. | where R is a lower alkyl radical selected from the class consisting of methyl and ethyl radicals.

The monohydric alcohol used to make the mixture of alkyl alkoxysilanes may be any one having the general formula R'OH where R' is an alkyl radical containing from 1 to 5 carbon atoms, preferably from 2 to 4 carbon atoms. Among such alcohols may be mentioned methanol, ethanol, propanol, isopropanol, butanol, isobutanol, amyl alcohol, etc. Although methanol or ethanol may be employed, generally it is found that due to the volatility of these alcohols, and the ease of their undesirable side reaction with HCl, more precautions have to be observed in making the alkoxysilanes. Although alcohols higher than the butanols can be employed, nevertheless those of higher chain length introduce undesirable odor and questions of toxicity. Monohydric alcohols containing, e.g., 8 or more carbon atoms react too sluggishly to be of value. For optimum ease in the manufacture of the alkoxysilanes, it is desirable that the alcohol used be such that the alkoxy silane obtained from the alcohol have a boiling point above 100° C. so that in its reaction with the dihydric alcohol, there would be less danger of undesirable volatilization loss of reaction product. It has been found that the monohydric alcohol, containing some dissolved HCl, which is recovered in the distillation step hereinafter described, is suitable for use in future alkoxylation reaction, either in a batch process or on a continuous recycle process.

The molar ratio of the monohydric alcohol to the chlorosilane (or mixture of chlorosilanes) should be such that there is present one mol of monohydric alcohol per silicon-bonded chlorine atom. However, advantageously one may employ from 0.5 to 2 mols of the monohydric alcohol per silicon-bonded chlorine atom, since, in addition to the silicon-bonded alkoxy groups, minor amounts of non-alkoxylated silicon-bonded chlorine atoms attached to silicon can be tolerated and may be economically advantageous. When the chlorosilane is predominantly alkyltrichlorosilane, about 0.5 mol of the monohydric alcohol per silicon-banded chlorine atom is the smallest ratio which will avoid gel formation when the dihydric alcohol is added. If desired, there may be a substantial excess of the number of mols of monohydric alcohol per chlorine atom, up to the economic limit which will be readily apparent to those skilled in the art. Within the limits described above, it will be apparent that the alkylsilane may also contain silicon-bonded chlorine atoms.

The manner for preparing the alkoxysilanes is relatively simple. It is only necessary to mix together the alkylchlorosilane or mixture of alkylchlorosilanes and the monohydric alcohol with the liberation of HCl. This interaction is effected with stirring and although no heat is necessary, gentle heating may be desirable under some circumstances. The reaction product comprising the alkylalkoxysilane or mixture of alkyl alkoxysilanes will be saturated with HCl to the extent of solubility of the system depending on the temperature at which the reaction is conducted and on the final temperature. Generally, it may be desirable to remove most of this dissolved HCl by gentle heating, for instance, at temperatures of about 50 to 100° C. However, a small amount of the HCl in the alkoxysilane mixture has been found desirable and necessary in order to accelerate the reaction between the alkoxy silane and the ethylene glycol. In general, the amount of HCl required for this purpose is of the order of from about 0.1% to the point of saturation, based on the total weight of the alkyl alkoxysilanes. Optimum range is of the order of about 1 to 10%, by weight, HCl based on the weight of alkoxysilanes in the solution. Instead of employing HCl in the alkoxysilane reactant where the HCl is derived from the reaction between the chlorosilane and the monohydric alcohol, one can add preformed HCl or other suitable acidic catalysts prior to removal of the monohydric alcohol.

The ethylene glycol used for the purposes recited above, in addition to being low in cost and being readily removable from the condensed organopolysiloxane in the ultimate use wherein the latter will be employed, has also the unique property of imparting water-solubility to the reaction product of the latter and the alkoxysilane. It was found that unexpectedly the use of an analagous material such as propylene glycol yielded water-insoluble products under equivalent conditions. For optimum water solubility, it is essential that for each alkoxy group present in the mixture of alkyl alkoxysilanes, one must employ in excess of one hydroxy group of the ethylene glycol. For optimum results, including ease of condensation of the ethylene glycol reaction product to the ultimate organopolysiloxane state, and for improved water-repellency and water-solubility, it is desirable to employ for reach equivalent of silicon-bonded alkoxy radical, ethylene glycol equivalent to at least 1.5 carbon-bonded hydroxyl groups. Thus, one could advantageously use at least 0.67 gram mol ethylene glycol for each gram equivalent of silicon-bonded alkoxy radical.

The alkyl alkoxysilane or alkyl alkoxysilanes and the ethylene glycol are mixed together and heated under vacuum at a temperature below 100° C. to volatilize the liberated monohydric alcohol and to sweep the hydrogen chloride out of the system to a point where essentially all of the alkoxy groups derived from the monohydric alcohol are removed. Although it is desirable that all such latter alkoxy groups be removed in this reaction between the alkyl alkoxysilane and ethylene glycol, in certain instances it is possible to tolerate up to 5% silicon-bonded alkoxy radicals which have not been reacted with the ethylene glycol, although preferably it is desirable that essentially all of these alkoxy radicals be removed and substituted by reaction with the ethylene glycol.

The reduced pressure used in this stage of the reaction should be sufficient to remove essentially all the released monohydric alcohol, although traces of the latter in the reaction mixture can be tolerated without undesirable results. It is essential that the temperature during reaction between the alkoxysilanes and the ethylene glycol should be maintained below 100° C. if one is to obtain complete water-solubility. Thus, if the temperature is raised above 100° C., water insolubility will be the result, thereby giving a product which is different from the benzene-insoluble, water-soluble products of the present invention and thus of little utility.

After interaction between the alkyl alkoxysilane or mixture of alkyl alkoxysilanes and the ethylene glycol, all traces of residual HCl not removed or swept out of the system should be neutralized, for instance, by use of finely divided calcium carbonate. The products thus obtained are low viscosity liquids ranging in viscosity from about 10 to 200 centipoises when measured at 25° C. These fluids are stable for long periods of time at temperatures ranging from 25 to 50° C. This is advantageous because the composition as such can be stored for long periods of time or can be transported over long distances at temperatures as high as 40 to 50° C.

The reaction product of the alkoxysilane and the ethylene glycol is a monomeric silane containing silicon-bonded alkyl groups and silicon-bonded hydroxy-alkoxy groups. Thus, taking as an example the reaction of a mixture of methyltriisopropoxysilane, trimethylisopropoxysilane in the requisite proportions, and ethylene glycol, one would obtain, when using, e.g., 3 mols of the glycol per mol of the mixture of silanes, compounds of the formula

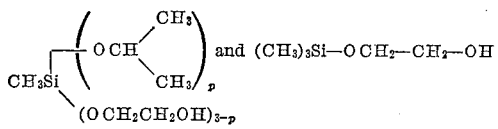 and $(CH_3)_3Si-OCH_2-CH_2-OH$ where $p=0$, 1, or 2. Obviously, the type of monomeric compounds obtained will vary depending upon such factors as the alkyl group attached directly to silicon by a C—Si linkage, the type of monohydric alcohol used, the proportions of the monohydric alcohol and ethylene glycol, etc. To obtain a product miscible in all proportions with water, the number of silicon-bonded alkoxy groups (derived from the monohydric alcohol) should be as close to zero as possible.

When it is desirable to use this reaction product of the alkyl alkoxysilane and the ethylene glycol (for brevity this product will hereinafter be referred to as "glycol reaction product"), it is only necessary to add a sufficient amount of water to the glycol reaction product to the desired concentration. Usually, this should be done only a short time before it is to be used because after the water is added the stability of the product decreases with time. The concentration in aqueous solutions of the glycol reaction product can be varied widely and can be used in concentrations ranging from about 0.5 to 100%, by weight, based on the total weight of the water and the glycol reaction product. For use as a water-repellent material, preferably the concentration is within the range of from about 5 to 50%, by weight.

In using the aqueous solutions of the glycol reaction product, it is only necessary to apply the aqueous solution to the surface which it is desired to treat (e.g., for purposes of sizing) or to render water-repellent. This may be done by brushing, spraying, dipping, flowing on the aqueous solution, etc. Thereafter, the treated materials can be allowed to air-dry to the organopolysiloxane state to obtain water-repellency, or they can be passed through a heated zone maintained at a temperature of from about 100° to 300° C. to effect volatilization of the dihydric alcohol and more rapid condensation to the organopolysiloxane state. After treatment with the aqueous solution of the dihydric alcohol reaction product, the surface coated therewith will be found to be water-repellent and such water-repellency is a durable one.

As a result of this drying or heat treatment to obtain the finally condensed organopolysiloxane, and because of the use of a non-ionic mixture of ingredients for treating various materials to render the same water-repellent, one obtains as a by-product, innocuous, substantially non-toxic ethylene glycol as contrasted to salts which are by-products when using ionic compositions. Thus, when employing, for instance, salts of the type described in U.S. Patent 2,723,211, upon condensation one obtains solid salts such as sodium chloride which would have to be removed by a special step in order to prevent interference with the water-repellency function, as well as undesirable staining or attack of the surfaces of the object treated. In the treatment of glass cloth which is to be used in applications involving electrical insulation, the presence of salts, such as sodium chloride, would undesirably affect the electrical properties. In contrast to this, the condensed composition of the present invention does not have water-soluble salts, and thus one would obtain products which had much better electrical properties than those obtained by means of the compositions composed of ionic materials.

In order that those skilled in the art may better understand how the present invention may be practiced, the following examples are given by way of illustration and not by way of limitation. All parts are by weight.

*Example 1*

A mixture of methylchlorosilanes composed of 9 mols methyltrichlorosilane and one mol trimethylchlorosilane was mixed with isopropanol in an amount equal to 1 mol of isopropanol per mol of silicon-bonded chlorine in the mixture of the methyl chlorosilanes. After effecting intermixture of the ingredients and volatilization of hydrogen chloride, the reaction mixture was heated gently to about 50° C. to volatilize the excess HCl, leaving behind about 8 to 10% dissolved HCl. Thereafter, ethylene glycol was added to the mixture of methylisopropoxysilanes in a molar concentration such that there were present 1.17 mols of the ethylene glycol for each silicon-bonded isopropoxy group. In adding the isopropanol and the ethylene glycol, two methods were employed. These methods were as follows:

Method A: Half the isopropanol was added to the mixture of methylchlorosilanes and thereafter the ethylene glycol diluted with the remainder of the isopropanol was added.

Method B: This is the reverse of Method A in that the mixture of methylchlorosilanes was added to the blend of the isopropanol and the ethylene glycol.

After addition, the mixture of the ethylene glycol with the methyl isopropoxysilanes was heated at a temperature of about 50° to 75° C. at a pressure of about 30 to 50 mm. Hg absolute, while removing isopropanol resulting from the reaction of the isopropoxy methylsilanes and the ethylene glycol. This heat-treatment tended to remove most of the HCl present in the system. Thereafter, the residual product was treated with calcium carbonate to remove traces of acid and filtered. Aqueous solutions of the ethylene glycol reaction product were prepared by dissolving the latter in water in a concentration of about 4%, by weight, of the total solution. Johns-Manville asbestos siding shingles were then treated by spraying the shingles (6″ x 12″ rectangular pieces) so that a thin film of the aqueous solution of the ethylene glycol reaction product was deposited on the shingles. These shingles were then air-dried for about 24 hours at a temperature of about 35° to 40° C. This was the only drying carried out and was done by natural diffusion at ambient temperatures. The shingles tested were a pastel green, which was a smooth pale green finish with relatively few granules on the surface. In order to test the water-repellency (after 72 hours' air-drying) and the ability of the treated shingles to resist staining, a dye spot test was adopted as follows: A standard solution of 0.50 gram methyl violet XXA (General Dyestuff Corporation) per gallon of distilled water was prepared. A pool of this solution about 1″ in diameter was placed on the surface of the treated shingle as gently as possible from a polyethylene squeeze bottle. After allowing the pool to remain in contact with the surface of the shingle for three minutes, the pool was quickly removed with an aspirator and the stain blotted at once with a neutral tissue. After drying for 10 minutes, the staining intensity was compared with a set of reference standards. The standards were selected from test specimens arbitrarily assigned numerical values from 1 (darkest stain) to 8 (invisible). The following Table II shows the preparation method, the percent concentration of the dihydric alcohol reaction product in the water and the results of the dye spot tests. The spray loading on each shingle surface with the aqueous solution of the water-repellent was about 11 to 13 grams per square foot of shingle.

TABLE II

| Sample Number | Preparation Method | Weight Percent Dihydric Alcohol Reaction Product | Water Repellency Dye Spot Test |
|---|---|---|---|
| 1 | A | 4 | 5 |
| 2 | B | 4 | 4 |
| 3 | No treatment | | 1 |

An additional, visual criterion of the degree of water-repellency was used. A narrow stream of water was allowed to fall from a height of 24 inches onto the horizontal, treated surface of the shingle specimens. In the case of treated sample Nos. 1 and 2, the impinging stream scattered instantly into small spherical beads, which remained for a time on the surface of the shingle, without apparent penetration or wetting thereof, prior to evaporation. In the case of the untreated control sample No. 3, the water spread over the shingle in a continuous film and was instantly absorbed into the surface, with pronounced darkening, and in a short time penetrated entirely through the thickness of the shingle, in the manner of blotting paper.

The following Examples 2 to 5 illustrate the criticality of ingredients and proportions of ingredients used if one is to obtain water-soluble products capable of having the desired properties such as inducing water-repellency, sizing and stiffening, etc.

*Example 2*

In this example, with the ethylene glycol used in each preparation cited, there was employed 360 parts isopropanol. The procedure for making each of the compositions described in the instant example was generally as follows:

A reaction vessel equipped with a reflux condenser and stirrer as well as a hydrogen chloride scrubber was charged with the isopropanol and chlorosilane (or mixture of chlorosilanes) in the stipulated proportions. The addition of the chlorosilane to the isopropanol took about 20 minutes and the mixing of the ingredients was continued for about 5 minutes until there was no further evidence of hydrogen chloride evolution. Thereafter, the stipulated amount of ethylene glycol (shown in Table III below) was added to the formed mixture of alkoxysilanes and the mixture of ingredients intimately stirred and then vacuum distilled to a final residue temperature of about 90° C. at between 30 to 60 mm. Hg absolute. The clear, liquid products thus obtained were stirred a few minutes with a small amount of calcium carbonate to neutralize any residual traces of HCl. The filtrates were clear liquids in the viscosity range of 10 to 200 centipoises. Each of the products of reaction between the alkoxysilane and the ethylene glycol was tested for water-solubility by dissolving varying amounts of the reaction product in water in concentrations ranging from about 1 to 100 percent, by weight, based on the weight of the water. The following Table III shows the various starting chlorosilanes employed in the reaction with the isopropyl alcohol, the molar concentrations of the chlorosilanes used, and the weight of the reactants. Table III also recites whether the above-described reaction products were soluble in water, thus indicating the relationship of composition to solubility. In the table, the symbol "I" means that the reaction product was insoluble in water in essentially all proportions with the exception that trivial quantities (less than 1 to 2 percent) of water could be dissolved in the reaction product; and the symbol "S" indicates that the reaction product was soluble in and miscible with water in all proportions. It will

TABLE III

| Sample No. | SiCl$_4$ | | CH$_3$SiCl$_3$ | | C$_6$H$_5$SiCl$_3$ | | (CH$_3$)$_2$SiCl$_2$ | | (C$_6$H$_5$)$_2$SiCl$_2$ | | (CH$_3$)$_3$SiCl | | Ethylene Glycol, Parts | Solubility in Water |
|---|---|---|---|---|---|---|---|---|---|---|---|---|---|---|
| | Mol Percent | Parts | Mol Percent | Parts | Mol Percent | Parts | Mol Percent | Parts | Mol Percent | Parts | Mol Percent | Parts | | |
| 4 | 10 | 54.6 | 70 | 336 | | | 10 | 41.4 | | | 10 | 34.7 | 556 | S |
| 5 | | | 100 | 450 | | | | | | | | | 557 | S |
| 6 | | | 90 | 405 | | | | | | | 10 | 32.4 | 520 | S |
| 7 | | | 70 | 362 | | | 20 | 89.2 | | | 10 | 37.4 | 557 | S |
| 8 | | | 50 | 337 | | | | | | | 50 | 243 | 558 | S |
| 9 | 30 | 135 | | | 70 | 391 | | | | | | | 540 | I |
| 10 | | | 70 | 315 | 30 | 194 | | | | | | | 557 | I |
| 11 | | | 50 | 225 | 50 | 317 | | | | | | | 557 | I |
| 12 | | | 33 | 192 | | | | | 67 | 332 | | | 557 | I |
| 13 | | | 10 | 62.7 | | | | | 90 | 486 | | | 544 | I |
| 14 | | | | | 100 | 635 | | | | | | | 557 | I |
| 15 | | | | | 50 | 383 | 50 | 234 | | | | | 560 | I |
| 16 | | | | | | | 100 | 387 | | | | | 372 | I |
| 17 | | | | | | | | | | | 100 | 544 | 562 | I | be evident from an examination of Table II that the use of amounts of methyltrichlorosilane outside the range described above gave insoluble products and that insoluble products were also obtained where concentrations of phenyltrichlorosilane of 30 mol percent or above were used with the methyltrichlorosilane in the initial reaction with the isopropyl alcohol. In addition, Table III shows that the use of phenyltrichlorosilane alone or in combination with dimethyldichlorosilane or the use of dimethyldichlorosilane alone or in combination with methyltrichlorosilane in proportions outside the scope of the claimed invention also gave insoluble products.

Treatment of masonry, such as concrete blocks, brick, cement, etc., with 3 to 6% aqueous solutions of sample Nos. 4 to 8 in Table III caused the surface of the masonry to become water-repellent without in any way affecting the ability of the air to pass readily through the pores of the masonry treated. Optimum water-repellency was obtained with those compositions which used no SiCl$_4$ in their preparation.

*Example 3*

In this example about 448.5 parts (3 mols) methyltrichlorosilane were added to 192 parts (6 mols) methanol in the same manner as was done in Example 2. During this addition, the temperature first rose to 62° C. and then fell to −5° C. To this methoxysilane reaction product were added 558 parts ethylene glycol (9.3 mols) and after intimately mixing the ingredients together the reaction product was vacuum-distilled to a residue temperature of 100° C. at 30 mm. mercury. This latter reaction product was then filtered and neutralized similarly as in Example 2 to give a composition which was miscible with water in all proportions and could be used for water-repellent purposes.

*Example 4*

This example illustrates the need for employing an intermediate monohydric alcohol and describes the effects of omitting the monohydric alcohol. More particularly, a mixture composed of 405 parts (2.7 mols) methyltrichlorosilane and 32.4 parts (0.3 mol) trimethylchlorosilane was added with stirring over a period of 20 minutes to 520 parts (8.39 mols, one mol per gram-atom of chlorine) of ethylene glycol. During the addition of the methylchlorosilanes, there was constant gel formation during the reaction, resulting in loss of product. The mixture was heated to 90° C. and held at this temperature for 15 minutes while sweeping the reaction product with nitrogen. Due to the very high concentration of HCl, it was not practical to neutralize the reaction product with calcium carbonate. Instead, ammonium acetate was employed for this purpose. The product thus obtained was incompletely soluble in water regardless of the proportions used.

*Example 5*

This example illustrates what happens when temperatures above 100° C. are employed during interaction of the alkoxy silane with the ethylene glycol. More particularly, 149.5 parts (1 mol) methyltrichlorosilane and 86 parts isopropanol were reacted with stirring similarly as described in Example 2 and then a mixture of 94 parts isopropanol and 186 parts (3.0 mols) ethylene glycol was added again with stirring. The reaction mixture was then distilled to a residue temperature of 160° C. at atmospheric pressure. There was some loss of product due to gel formation on the walls of the reaction vessel. This product, when neutralized and filtered as described in Example 2 above, was clear but was only partially soluble in water to the extent of about 3 to 5 percent. In the higher concentration it was immiscible.

It will, of course, be apparent to those skilled in the art that in addition to the methylchlorosilanes employed in the foregoing examples, one can also use hydrolyzable ethylsilanes reactable with monohydric alcohols of the class recited previously. Among mixtures of such hydrolyzable ethylsilanes which may be used are, for instance, methyltrichlorosilane, SiCl$_4$, and triethylchlorosilane; ethyltrichlorosilane and triethylchlorosilane; ethyltrichlorosilane and trimethylchlorosilane; methyltrichlorosilane and triethylchlorosilane; methyltrichlorosilane, diethyldichlorosilane and triethylchlorosilane, etc. In addition, the proportions of ingredients, as well as conditions of reaction, may be varied within the limits described previously without departing from the scope of the invention.

The compositions described herein can be employed in various applications, particularly for rendering surfaces water-repellent and for purposes of stiffening various types of porous materials. Thus, when working with bias-cut cloth, such as glass cloth, it is often desirable to strengthen and stiffen the cloth in order to permit more ready handling thereof. The compositions disclosed and claimed in the present application, in dilute (2 to 5% concentration) solutions, can be used to treat such bias-cut cloth, and after allowing the same to dry at room temperature for times ranging from about two to twelve hours or by heating the treated cloth at temperatures around 100 to 250° C. for times ranging from thirty seconds to ten minutes, it will be found that the cloth will be sufficiently stiff to permit ready handling under moderate tension, as in further coating the fabric with a liquid resin or paste, without distortion of the weave pattern.

As pointed out in Example 1, shingles of various types, particularly asbestos shingles, can be treated with aqueous solutions of the above-described compositions to render the shingles water-repellent and to reduce the tendency of the asbestos shingles to stain. This is a serious problems in the use of asbestos shingles because of the porosity of the shingles and because of the undesirable attraction to water-borne staining. By treating shingles with aqueous solutions of the above-described compositions, it is possible to improve the water-repellency of the shingles while at the same time materially reducing and often completely eliminating the tendency of the shingles to stain. Such treatment often prevents the shingle from darkening prematurely due to accumulation of dirt from the environment.

The compositions herein described can also be used to treat glass fibers, or cloth made from glass fibers, to size the same and to prepare them for further treatment with other resinous compositions, for instance, other organopolysiloxane compositions, phenolic resins, etc., used in the manufacture of laminates prepared from such glass fibers or glass cloth. Treatment with the compositions herein described improves the adhesion between the glass fibers and the subsequent bonding resins employed in coating and laminating applications.

What I claim as new and desire to secure by Letters Patent of the United States is:

1. A composition of matter insoluble in benzene but soluble in water in all proportions obtained by (1) interacting ethylene glycol in the presence of an acidic catalyst with a mixture containing from 50 to 100 mol percent of methyltriisopropoxysilane and from 0 to 50 mol percent trimethylisopropoxysilane, the sum of the mol percents of the methyltriisopropoxysilane and the trimethylisopropoxysilane being equal to 100 mol percent, there being present at least 1.5 carbon-bonded hydroxy groups of the ethylene glycol for each equivalent of silicon-bonded isopropoxy group in the mixture of methylisopropoxy silanes, and (2) thereafter heating the mixture of ingredients at a temperature below 100° C. while at the same time removing liberated isoproyl alcohol.

2. The process for making a composition of matter which is insoluble in benzene but soluble in water in all proportions which comprises (1) interacting, in the presence of an acidic catalyst, ethylene glycol with a mixture of alkyl alkoxysilanes containing from 50 to 100 mol percent of a monoalkyl trialkoxysilane, from 0 to 50 mol percent of a trialkyl alkoxysilane, from 0 to 10 mol percent of a dialkyl dialkoxysilane and from 0 to 10 mol percent of a tetra-alkoxysilane, the sum of the mol percents of the various alkyl alkoxysilanes being equal to 100 mol percent, the silicon-bonded alkyl group being selected from the class consisting of methyl radicals and ethyl radicals and the alkyl group of the alkoxy radical being the residue of a monohydric alcohol containing from 1 to 5 carbon atoms, there being present at least 1.5 carbon-bonded hydroxy groups of the ethylene glycol for each equivalent of silicon-bonded alkoxy group in the mixture of alkyl alkoxysilanes, and (2) thereafter heating the mixture of ingredients at a temperature below 100° C. while at the same time removing liberated aliphatic monohydric alcohol.

3. The process as in claim 2 in which the alkyl groups of the alkyl alkoxysilanes are methyl groups and the alkoxy groups are isopropoxy groups.

4. The process for sizing glass cloth which comprises treating the said glass cloth with an aqueous solution of a mixture of ingredients comprising a composition of matter insoluble in benzene but soluble in water in all proportions obtained by (1) interacting, in the presence of an acidic catalyst, ethylene glycol with a mixture of alkyl alkoxysilanes containing from 50 to 98 mol percent of a monoalkyl trialkoxysilane, from 0 to 50 mol percent of a trialkyl alkoxysilane, from 0 to 10 mol percent of a dialkyl dialkoxysilane and from 0 to 10 mol percent of a tetra-alkoxysilane, the sum of the mol percents of the various alkyl alkoxysilanes being equal to 100 mol percent, the silicon-bonded alkyl group being selected from the class consisting of methyl radicals and ethyl radicals and the alkyl group of the alkoxy radical being the residue of a monohydric alcohol containing from 1 to 5 carbon atoms, there being present at least 1.5 carbon-bonded hydroxy groups of the ethylene glycol for each equivalent of silicon-bonded alkoxy group in the mixture of alkyl alkoxysilanes and (2) thereafter heating the mixture of ingredients at a temperature below 100° C. while at the same time removing liberated aliphatic monohydric alcohol.

5. The process for rendering masonry water-repellent which comprises treating the latter with an aqueous solution of a mixture of ingredients comprising a composition of matter insoluble in benzene but soluble in water in all proportions obtained by (1) interacting, in the presence of an acidic catalyst, ethylene glycol with a mixture of alkyl alkoxysilanes containing from 50 to 98 mol percent of a monoalkyl trialkoxysilane, from 0 to 50 mol percent of a trialkyl alkoxysilane, from 0 to 10 mol percent of a dialkyl dialkoxysilane and from 0 to 10 mol percent of a tetra-alkoxysilane, the sum of the mol percents of the various alkyl alkoxysilanes being equal to 100 mol percent, the silicon-bonded alkyl group being selected from the class consisting of methyl radicals and ethyl radicals and the alkyl group of the alkoxy radical being the residue of a monohydric alcohol containing from 1 to 5 carbon atoms, there being present at least 1.5 carbon-bonded hydroxy groups of the ethylene glycol for each equivalent of silicon-bonded alkoxy group in the mixture of alkyl alkoxysilanes and (2) thereafter heating the mixture of ingredients at a temperature below 100° C. while at the ame time removing liberated aliphatic monohydric alcohol.

6. The process for making a composition of matter which is insoluble in benzene but soluble in water in all proportions which comprises (1) interacting with a saturated aliphatic monohydric alcohol a mixture of chlorosilanes containing from 50 to 98 mol percent of a monoalkyl trichlorosilane, from 0 to 50 mol percent of a trialkylchlorosilane, from 0 to 10 mol percent of a dialkyldichlorosilane and from 0 to 10 mol percent silicon tetrachloride, the sum of the mol percents of the various chlorosilanes being equal to 100 mol percent, the monohydric alcohol containing from 1 to 5 carbon atoms and the alkyl groups attached to silicon being selected from the class consisting of methyl and ethyl radicals, (2) effecting interaction between the formed mixture of alkoxy silanes with ethylene glycol, there being present at least 1.5 carbon-bonded hydroxy groups of the ethylene glycol for each equivalent of silicon-bonded alkoxy group in the mixture of alkyl alkoxysilanes, and (3) heating the mixture of ingredients at a temperature below 100° C. while at the same time removing liberated aliphatic monohydric alcohol.

References Cited in the file of this patent

UNITED STATES PATENTS

| | | |
|---|---|---|
| 2,386,793 | Hanford | Oct. 16, 1945 |
| 2,441,066 | Hanford | May 4, 1948 |
| 2,529,956 | Myles et al. | Nov. 14, 1950 |
| 2,559,342 | Burkhard | July 3, 1951 |
| 2,584,351 | Hunter et al. | Feb. 5, 1952 |
| 2,628,215 | Hunter | Feb. 10, 1953 |